United States Patent [19]
Peoples

[11] 3,821,107
[45] June 28, 1974

[54] CLOSED CIRCUIT DOMESTIC SEWAGE TREATING METHOD

[76] Inventor: Charles Frederick Peoples, 455 Main St., Stoneham, Mass. 02180

[22] Filed: June 14, 1972

[21] Appl. No.: 262,447

[52] U.S. Cl.................... 210/12, 210/17, 210/150, 210/152
[51] Int. Cl............................................. C02c 1/04
[58] Field of Search............ 210/2, 10, 12, 15, 17, 210/152, 150, 151; 4/10, 115

[56] References Cited
UNITED STATES PATENTS
3,440,669   4/1969   Boester................................. 210/15
3,487,015   12/1969   Boester................................. 210/12
3,721,346   3/1973   Lore et al. .......................... 210/152

*Primary Examiner*—Charles N. Hart
*Assistant Examiner*—Benoit Castel
*Attorney, Agent, or Firm*—Dean S. Edmonds

[57] ABSTRACT

Method and apparatus are described for heating flushed domestic sewage to a liquifying digestion temperature under aeration conditions, withdrawing digestion liquid through a filtering mass of biologically active sewage solids in the digestion zone to form a biologically pure flushing liquid for the sewage in required volume, and removing excess withdrawn digestion liquid to eliminate it from the system.

2 Claims, 1 Drawing Figure

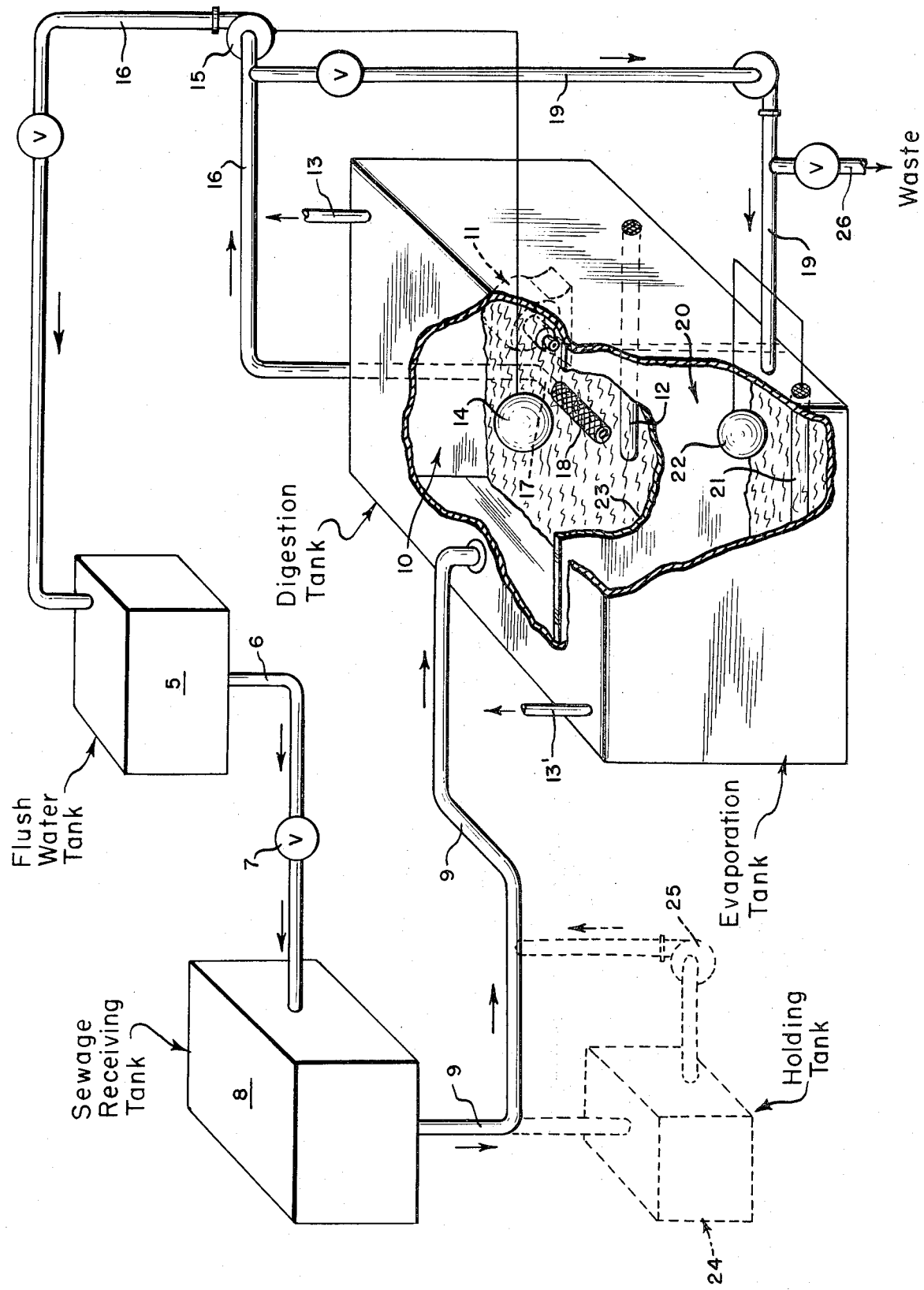

CLOSED CIRCUIT DOMESTIC SEWAGE TREATING METHOD

This invention relates to the treatment of domestic sewage and, more particularly, to a method for treating domestic sewage in a closed circuit.

Mobile living quarters, such as automative campers and trailers and small marine vessels, require domestic sewage holding or disposal equipment. Holding devices present the problem of frequent stops at pumping-out or disposal stations, and disposal equipment presently available generally requires extensive treatment such as complete evaporation and incineration of the sewage.

I have now devised a closed circuit or self-contained method and system for treatment of domestic sewage particularly adapted for use in mobile or fixed campers, boats, and the like. The method of my invention comprises flushing with substantially biologically pure aqueous liquid a charge of domestic sewage from a sewage receiving zone into a sewage digestion zone, digesting the flushed sewage in the latter zone by heating it to and maintaining it at a temperature within the range of about 95° to 130°F. in the presence of an aerating supply of air, withdrawing liquid resulting from said digestion through a porous mass of biologically active sewage solids in the digestion zone to yield a substantially biologically pure aqueous liquid, returning as the flushing liquid a volume of thus-withdrawn aqueous liquid equal to that of the flushing liquid, and removing from the circuit, advantageously by evaporative heating, the remaining portion of the liquid withdrawn from the digestion zone. The apparatus of the invention comprises a vessel for containing a supply of substantially biologically pure flushing liquid, conduit means for supplying the flushing water to a domestic sewage receiver, conduit means for delivering the flushed sewage to a sewage digestion vessel, heating means for raising the temperature of the sewage in the digestion vessel to between about 95° and 130°F., aerating means for supplying air to the heated sewage in the digestion vessel, discharge conduit means for delivering substantially biologically pure flushing liquid from the digestion vessel to the flushing liquid supply vessel, a porous filter positioned in the entrance of the discharge conduit in the digestion vessel and adapted to accumulate thereon a mass of biologically active sewage solids from the sewage in the digestion vessel, and means for effecting volume reduction of a portion of the liquid discharged through the filter and discharge conduit so as to maintain a substantially uniform volume of available flushing liquid in the closed circuit system.

These and other novel features of the method and apparatus of the invention will be more readily understood from the following discussion taken in conjunction with the accompanying drawing in which the single FIGURE is a schematic diagram, partly broken away, of the sewage treating system of my invention.

As shown in the drawing, a flush water tank 5 is provided for holding a supply of substantially biologically pure water. This water is permitted to flow, advantageously by gravity, through a flushing conduit 6 provided with a control valve 7 and into a toilet associated with a receiving tank, the toilet and receiving tank being designated collectively in the drawing as the sewage receiving tank 8. The sewage and flush water flows, again advantageously by gravity, through a receiver conduit 9 to a sewage digestion tank 10.

The sewage digestion tank comprises a closed vessel provided with a sewage aerator of any conventional design such, for example, as a motor-driven submerged air sprayer 11 which provides an aerobic supply of ambient or heated air. In addition, the digestion tank 10 is provided with heating means, such as a submerged or external electrically- or fuel-heated tube 12, adapted to be thermostatically controlled by conventional means in order to heat the sewage in the tank to, and maintain it at, a temperature of about 95° to 130°F. Under these conditions, I have found that the sewage is substantially completely liquified and digested within a holding period initially of about two hours but subsequently under stabilized conditions within a holding period of about 20 minutes, and within the aforementioned digestion temperature of about 105°F. appears to produce the desired digestion in a minimum period of time. Temperatures below about 95°F. create such slow digestion rates as to be relatively inefficient in fostering digestion, and temperatures above about 130°F. tend to retard or even stop the digestion operation. Effluent gas from the digestion, and composed primarily of methane, is discharged through a vent 13 in the top of the digestion tank.

If the digestion tank were to be used for a batch operation, complete digestion would be obtained with resulting complete liquifaction of the sewage to a biologically inactive liquid and a predominantly methane effluent gas. However, in normal usage raw sewage is charged to the digestion tank at irregular intervals, often before the sewage already present in the tank 10 is completely digested. I have found, however, that a biologically inactive or purified liquid, consisting essentially of water, can be obtained from the digestion tank without interfering with the digestion in progress therein if a portion of the liquid component of the sewage undergoing digestion is withdrawn through a mass of biologically active solids in the digestion zone. The liquid can then be used to replace used flushing liquid in the flush water tank 5 to complete the flow circuit in my sewage treating system.

This reconstitution of the flushing liquid is obtained, pursuant to the invention, by withdrawing only a portion of the liquid component of the sewage mass being digested in the tank 10. Such control is readily obtained by utilizing a float 14, or any equivalent conventional level-sensing device, to monitor the level of sewage in the tank 10 and to cause the liquid component to be withdrawn by a pump 15 in a flushing liquid return conduit 16 communicating between the digestion tank 10 and the flushing water tank 5. The inlet end 17 of the conduit 16, through which the liquid component of the digesting sewage in the tank 10 is withdrawn, is provided with a relatively massive or large-surface filter 18 such, for example, as a tubular mass of "seized" metal conventionally obtained by compressing metal turnings or scrap or a mass of conventional filtering sand, or the like. Sewage solids are collected on the filter 18, and I have found that the withdrawal of the sewage liquid component through this biologically active mass tends to substantially complete the digestion of withdrawn fluidized sewage in the liquid component. As a result, the liquid component withdrawn from the digestion tank 10 through the flush water return conduit 16 is substantially odorless and biologically inactive when it is returned to the flush water tank 5.

In order to maintain the liquid volume in balance in my closed circuit system, I have found it advantageous to bypass through a valved conduit 19 a portion of the excess liquid component withdrawn from the digestion tank 10. This by-passed portion of the liquid component is delivered to an evaporation tank 20 which is also heated by an immersed heating tube 21, or the like, operated in response to a conventional level-sensing device 22 within the tank 20. The heating capacity of the heater 21 is sufficient to reduce by evaporation the volume of liquid component which accumulates in the tank 20. By discharging the evaporated aqueous phase of this excess portion of the liquid component of the digestion mass through a vent 13' in the tank 20, the volume of liquid withdrawn from the digestion tank 10 can be controlled to equal the total aqueous volume of the sewage phase flushing liquid delivered to the digestion tank 10. Thus, the entire system is in balance and is independent of make-up flushing water and of waste disposal facilities.

The sewage digestion tank 10 and the evaporation tank 20 can be separate from one another but, because both require heating, it is possible to form the two tanks by partitioning a single larger tank as shown in the drawing. When this compartmented construction is used, a partition wall 23 of heat-insulating material is used so that the evaporative temperature prevailing in the evaporation tank 20 will not cause, by heat transfer through the partition and through other walls of the compartmental tank, excessive heating of the sewage digestion mass in the digestion tank 10. Proper choice of the material and thickness of the partition wall 23 makes possible controlled heat transfer from the tank 20 to the tank 10. The resulting conservation of heat considerably decreases the required heat input to the digestion operation and effects a significant improvement in the overall efficiency of the system, although construction in the form of separate digestion and evaporation tanks is less expensive and more amenable to compact arrangement of these components.

The sewage treating system of the invention is compact and required only a small amount of energy to maintain it in operation. In order to provide the system with temporary excess or surge capacity, I have found it advantageous to provide a holding tank 24 connected in parallel to the receiver discharge conduit 9, as shown in dotted lines in the drawing. The holding tank is thus capable of holding raw sewage from the sewage receiving tank until the level in the digestion tank 10 has been sufficiently lowered to cause stopping of the flush liquid return pump 15. A pump 25 in the holding tank circuit can then be operated, for example, in response to stopping of the flush liquid return pump 15, to transfer the contents of the holding tank 24 to the digestion tank 10. In case of temporary overloading of the system with regeneration of more flushing liquid than required, excess biologically inactive liquid can be discharged through a valved waste line 26 connected to the by-pass conduit 19.

I claim:

1. A method for the closed circuit treatment of domestic sewage which comprises the steps of flushing with substantially biologically pure aqueous liquid a charge of domestic sewage from a sewage receiving zone into a sewage digestion zone, digesting the flushed sewage in the sewage digestion zone by heating it to and maintaining it at a temperature within the range of about 95° to 130°F., placing a filter made of a tubular mass of seized metal at the bottom of the tank, accumulating a porous mass of biologically active sewage solids in the digestion zone around and on said filter, aerating the heated sewage with an aerating supply of air, said aerating supply of air not interfering with said accumulation of said porous mass of biologically active sewage solids, withdrawing liquid resulting from the digestion of the aerated sewage through said porous mass of biologically active sewage solids in the digestion zone and said filter with said porous accumulation of sewage solids disposed thereon to yield a substantially biologically pure aqueous liquid, said sewage solids being maintained at a temperature within said range, returning as the flushing liquid a volume of the withdrawn liquid equal to that of the flushing liquid, and removing from the circuit primarily the remaining portion of the liquid withdrawn from the digestion zone.

2. The method according to claim 1 in which the remaining portion of the liquid withdrawn from the digestion zone is removed by evaporative heating.

* * * * *